E. CROTHER & M. BERGERON.
Velocipedes.

No. 159,564 — Patented Feb. 9, 1875.

WITNESSES:
Chas. Nida
A. F. Perry

INVENTOR
E. Crother and
BY M. Bergeron
ATTORNEYS.

UNITED STATES PATENT OFFICE.

EDWIN CROTHER AND MICHEL BERGERON, OF HACKENSACK, NEW JERSEY.

IMPROVEMENT IN VELOCIPEDES.

Specification forming part of Letters Patent No. 159,564, dated February 9, 1875; application filed December 19, 1874.

*To all whom it may concern:*

Be it known that we, EDWIN CROTHER and MICHEL BERGERON, of Hackensack, Bergen county, New Jersey, have invented a new and Improved Ambulating-Machine, of which the following is a specification:

The invention will first be fully described, and then pointed out in the claim.

Figure 1:
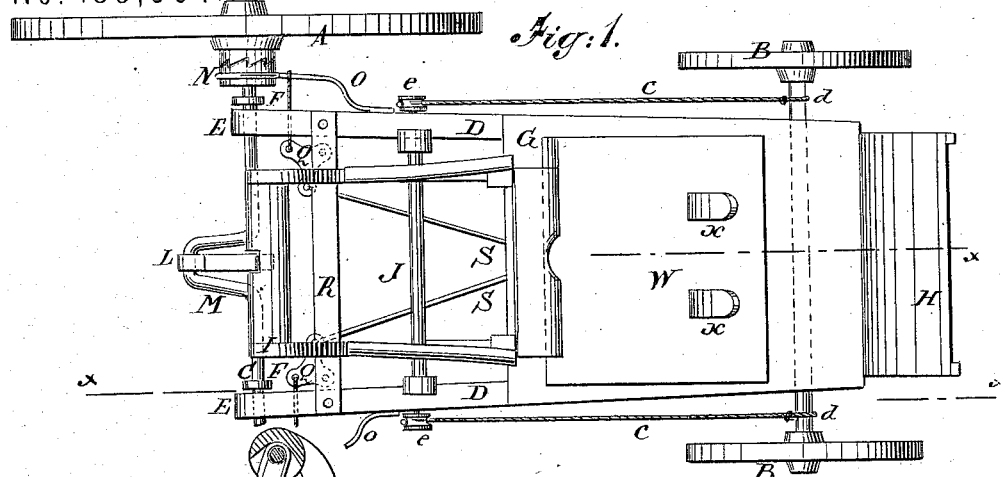
Figure 2:
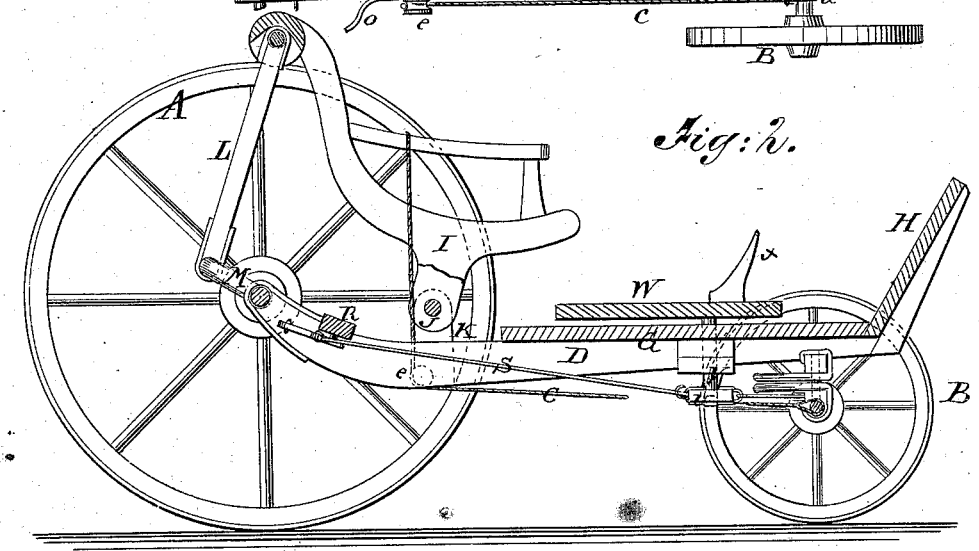
Figure 3:
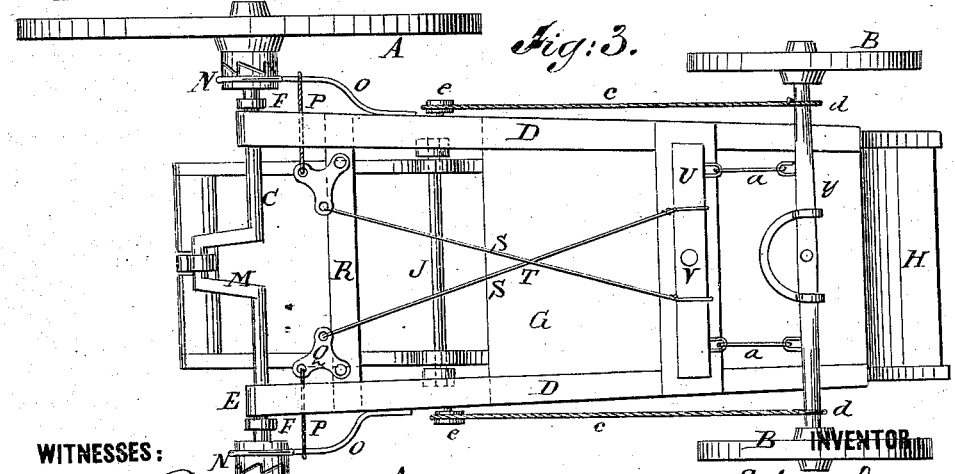

Figure 1 is a top view of the machine. Fig. 2 is a longitudinal section of Fig. 1, taken on the line $x\,x$; and Fig. 3 shows the ambulator bottom side up, for the purpose of showing more clearly the means employed for steering the machine.

Similar letters of reference indicate corresponding parts.

A are the two rear wheels. B B are the front wheels, but the machine may be constructed with a single front wheel. C is the rear axle. D D are side rails, attached to the rear axle, with eyes E E, which eyes allow the axle to revolve within them. F F are collars on the axle to keep the rails in place. G is the bottom and H the dash board, both fastened to the side rails. I represents the seat or chair, which is arranged to rock on the rod J, extending across the machine, and supported by the stands K on the side rails. From the top of the back of this chair extends a pitman-rod, L, which is connected with the crank M of the rear axle. The rider gives the chair a rocking motion, and thus imparts power to propel the machine. The insides of the hubs of the rear wheels are formed into clutches, which receive the sliding clutch-couplings N on the axle. O are springs attached to the side rails, which take hold of the couplings. P are chains or cords attached to the springs, which extend inward, and are attached to the bell-cranks Q, which cranks are pivoted to the cross-pieces R. S S are rods, cords, or chains which are attached to the bell-cranks, and, crossing each other at the points T, are connected with the sway-bar U, which oscillates on the pin V, which pin extends through the floor, and has attached to its upper end the foot-board W, on which are the foot-pieces X X. The sway-bar U is connected with the forward axle Y by the rods $a\,a$. The sway-bar U is oscillated or vibrated back and forth on its central pin V by the pressure of the foot on the foot-pieces X X, which action changes the position of the front axle and wheels, and steers the machine. The action of the forward axle also operates on the couplings and throws them out of gear with the rear wheel, so that that wheel will revolve freely on the axle, while the other wheel becomes the sole propelling-wheel. This effect may be produced by the cords or lines $c\,c$, which are attached to the forward axle, as seen at $d\,d$, and extend under the pulleys $e\,e$, and up to the rider, so that he can use either his hands or his feet, or both together, to control the direction and uncouple one of the wheels for turning curves in the road. When the strain upon the spring O ceases the reaction throws the coupling into gear with the wheel, and both wheels become propelling-wheels. The machine may be constructed with a single steering-wheel in front, with some slight modifications.

We do not confine ourselves to the precise construction and arrangement shown, as variations may be made in many ways without departing from our invention.

Having thus described our invention, we claim as new and desire to secure by Letters Patent—

The combination of foot-board W, foot-pieces X X, sway-bar U, connections $a\,a$, rods S S, bell-cranks Q Q, springs O O, and connections P P, substantially as and for the purposes described.

EDWIN CROTHER.
MICHEL BERGERON.

Witnesses:
T. B. MOSHER,
ALEX. F. ROBERTS.